United States Patent
Rideout et al.

(10) Patent No.: US 10,191,621 B2
(45) Date of Patent: Jan. 29, 2019

(54) EXPOSING POPULATED LISTS OF PERSONALIZED STRINGS

(71) Applicant: Microsoft Technology Licensing, LLC, Redmond, WA (US)

(72) Inventors: Mark Rodger Rideout, Redmond, WA (US); Ana Isabel A. N. Ribeiro Alberts, Borehamwood (GB); Andrew Stuart Glass, Seattle, WA (US); Jan-Kristian Markiewicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 15/142,327

(22) Filed: Apr. 29, 2016

(65) Prior Publication Data

US 2017/0315679 A1    Nov. 2, 2017

(51) Int. Cl.
*G06F 3/0482* (2013.01)
*G06F 3/0488* (2013.01)
*G06F 17/27* (2006.01)
*G06F 17/24* (2006.01)

(52) U.S. Cl.
CPC ........ *G06F 3/0482* (2013.01); *G06F 3/04886* (2013.01); *G06F 17/243* (2013.01); *G06F 17/276* (2013.01)

(58) Field of Classification Search
CPC .......................... G06F 3/0482; G06F 3/04886
See application file for complete search history.

(56) References Cited

U.S. PATENT DOCUMENTS

| | | | |
|---|---|---|---|
| 7,802,191 B2 | 9/2010 | Pettinati et al. | |
| 8,645,825 B1 * | 2/2014 | Cornea | G06F 17/3064 715/257 |
| 2002/0115476 A1 | 8/2002 | Padawer et al. | |
| 2003/0090471 A1 | 5/2003 | Slaunwhite et al. | |

(Continued)

FOREIGN PATENT DOCUMENTS

WO    2014098798 A1    6/2014

OTHER PUBLICATIONS

"Using the HTML Help control to display contextual help—CodeProject", Published Feb. 17, 2003, Available at http://www.codeproject.com/Articles/3679/Using-the_HTML-Help-control-to-display-contextual?display=Print, retrieved on Jul. 14, 2017, pp. 1-2.

(Continued)

*Primary Examiner* — Jennifer N To
*Assistant Examiner* — Ashley M Fortino
(74) *Attorney, Agent, or Firm* — Workman Nydegger

(57) ABSTRACT

Presenting a list of personalized strings to a user in response to the user's interaction with a single key of a keyboard. Interaction of a user with a single key of a keyboard is detected. Responsive to detecting the user interaction at the single keyboard key, a string type associated with the user interaction is identified. One or more personalized strings that are associated with the user and that are of the identified string type are also identified. A list of strings with the one or more personalized strings of the string type associated with the user interaction is then populated. The populated list of strings is then presented, wherein each string of the list of strings comprises a user-selectable element.

20 Claims, 5 Drawing Sheets

(56) References Cited

U.S. PATENT DOCUMENTS

| | | | | |
|---|---|---|---|---|
| 2003/0154292 | A1* | 8/2003 | Spriestersbach | G06F 3/0219 709/228 |
| 2004/0239637 | A1 | 12/2004 | Williams et al. | |
| 2007/0240079 | A1 | 10/2007 | Flynt et al. | |
| 2008/0126983 | A1 | 5/2008 | Keohane et al. | |
| 2009/0199122 | A1 | 8/2009 | Deutsch et al. | |
| 2009/0282228 | A1* | 11/2009 | Childs | G06F 9/44505 713/1 |
| 2011/0225254 | A1 | 9/2011 | Atkins et al. | |
| 2011/0314405 | A1 | 12/2011 | Turner et al. | |
| 2013/0263039 | A1 | 10/2013 | Fahlgren et al. | |
| 2014/0098798 | A1 | 6/2014 | Khandekar et al. | |
| 2015/0178259 | A1* | 6/2015 | Davis | G06F 17/241 715/230 |
| 2015/0339037 | A1 | 11/2015 | Duxbury | |
| 2016/0012315 | A1* | 1/2016 | Perrin | G06K 9/00409 382/161 |
| 2016/0117329 | A1* | 4/2016 | Busey | G06F 17/3053 707/726 |

OTHER PUBLICATIONS

"International Search Report and the Written Opinion Issued in PCT Application No. PCT/US2017/029228", dated Jul. 26, 2017.

"MIT App Inventor", Published on: Aug. 15, 2012 Available at: http://appinventor.mit.edu/explore/content/social.html#EmailPicker.

Clitter, Sandra, "Your Tech Tamer", Published on: Aug. 8, 2011 Available at: http://www.yourtechtamer.com/blog/2011/08/can-you-create-a-shortcut-to-auto-paste-your-email-address-onto-the-clipboard/.

"Mozilla support: Thunderbird", Published on: Sep. 2, 2014 Available at: https://support.mozilla.org/en-US/kb/addressing-email#thunderbird:win7;tb38.

Broida, Rick, "PCWorld: Create a Keyboard Shortcut to Insert Your E-Mail Address", Published on: Dec. 14, 2012 Available at: http://www.pcworld.com/article/238709/create_a_keyboard_shortcut_to_insert_your_e_mail_address.html.

Horowitz, Paul, "OSXDaily: Create a Shortcut for Typing eMail Address Quickly in iOS", Published on; Aug. 4, 2012 Available at: http://osxdaily.com/2012/08/04/create-shortcut-for-typing-email-address-ios/.

Pearson, William, "OSXDaily: Set a Shortcut to Type an Email Address Instantly in Mac OS X with Text Expansion", Published on: Aug. 15, 2012 Available at: http://osxdaily.com/2012/08/15/email-address-type-shortcut-mac-os-x-text-expansion/.

Wyatt, Allen, "WordTIPS", Published on: Apr. 19, 2011 Available at: http://word.tips.net/T006765_Inserting_Text_with_a_Shortcut_Key.html.

* cited by examiner

EXPOSING POPULATED LISTS OF PERSONALIZED STRINGS

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, a large portion of computer systems have taken the shape of relatively small mobile devices having touchscreen displays.

While these mobile devices may be smaller than previous computer systems, oftentimes they still include high levels of processing power. Accordingly, mobile devices are now capable of performing various computing tasks that previously required much larger computer systems. As such, for many of these tasks to be completed on a mobile device, a user must use a touchscreen keyboard as the primary means of input. While touchscreen keyboards are convenient in many ways, alternative characters and complex strings can often be difficult and time-consuming for a user to input.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to presenting a list of personalized strings to a user in response to the user's interaction with a single key of a keyboard. For example, in some embodiments, interaction of a user with a single key of a keyboard may be detected. Responsive to detecting the user interaction at the single keyboard key, a string type associated with the user interaction is identified. One or more personalized strings that are associated with the user and that are of the identified string type are also identified. A list of strings with the one or more personalized strings of the string type associated with the user interaction is then populated. The populated list of strings is then presented, wherein each string of the list of strings comprises a user-selectable element.

Presenting such a list of personalized strings may allow a user to input information on a keyboard quickly and efficiently. For instance, a user may be able to input an email address or other string that includes infrequently used characters such as '@' and "_" on a touchscreen keyboard, without requiring the user to switch to an alternative keyboard layout multiple times.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to presenting a list of personalized strings to a user in response to the user's interaction with a single key of a keyboard. For example, in some embodiments, interaction of a user with a single key of a keyboard may be detected. Responsive to detecting the user interaction at the single keyboard key, a string type associated with the user interaction is identified. One or more personalized strings that are associated with the user and that are of the identified string type are also identified. A list of strings with the one or more personalized strings of the string type associated with the user interaction is then populated. The populated list of strings is then presented, wherein each string of the list of strings comprises a user-selectable element.

Presenting such a list of personalized strings may allow a user to input information on a keyboard quickly and efficiently. For instance, a user may be able to input an email address or other string that includes infrequently used characters such as '@' and '_' on a touchscreen keyboard, without requiring the user to switch to an alternative keyboard layout multiple times.

Because the principles described herein operate in the context of a computing system, a computing system will first be described as an enabling technology for the principles described herein. Thereafter, further details regarding the population of lists of personalized and contextual strings will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
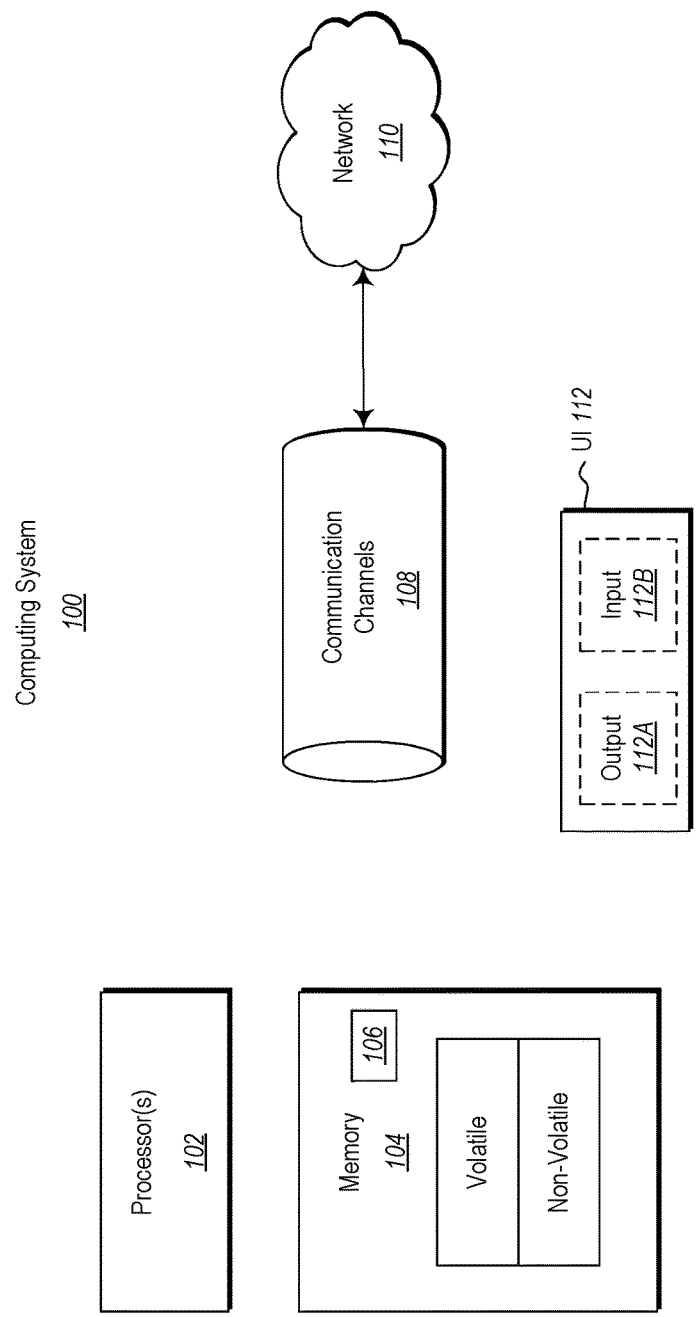
FIG. 1 illustrates an example computer system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "controller", "validator", "runner", "deployer" or the like, may also be used. As used in this description and in the case, these terms (regardless of whether the term is modified with one or more modifiers) are also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, cameras, keyboards, mouse of other pointer input, sensors of any type, and so forth. In accordance with the principles describe herein, alerts (whether visual, audible and/or tactile) may be presented via the output mechanism 112A.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

FIG. 2 illustrates an example touchscreen keyboard 200A that includes a multiple character and function keys. As an example, the touchscreen keyboard 200A might be displayed on one of the output mechanisms 112A of the computing system 100 of FIG. 1. As used herein, the terms touchscreen keyboard, virtual keyboard, and software keyboard, are all used interchangeably. While many different layouts and keys could be included in keyboard 200A, the layout and keys shown are for example purposes only. Accordingly, the principles described herein are not limited to any particular keyboard layout or keyboard keys. Furthermore, while keyboard 200A represents a touchscreen keyboard, the principles described herein may equally apply to hardware keyboards and hardware keyboard layouts.

Figure 2A:
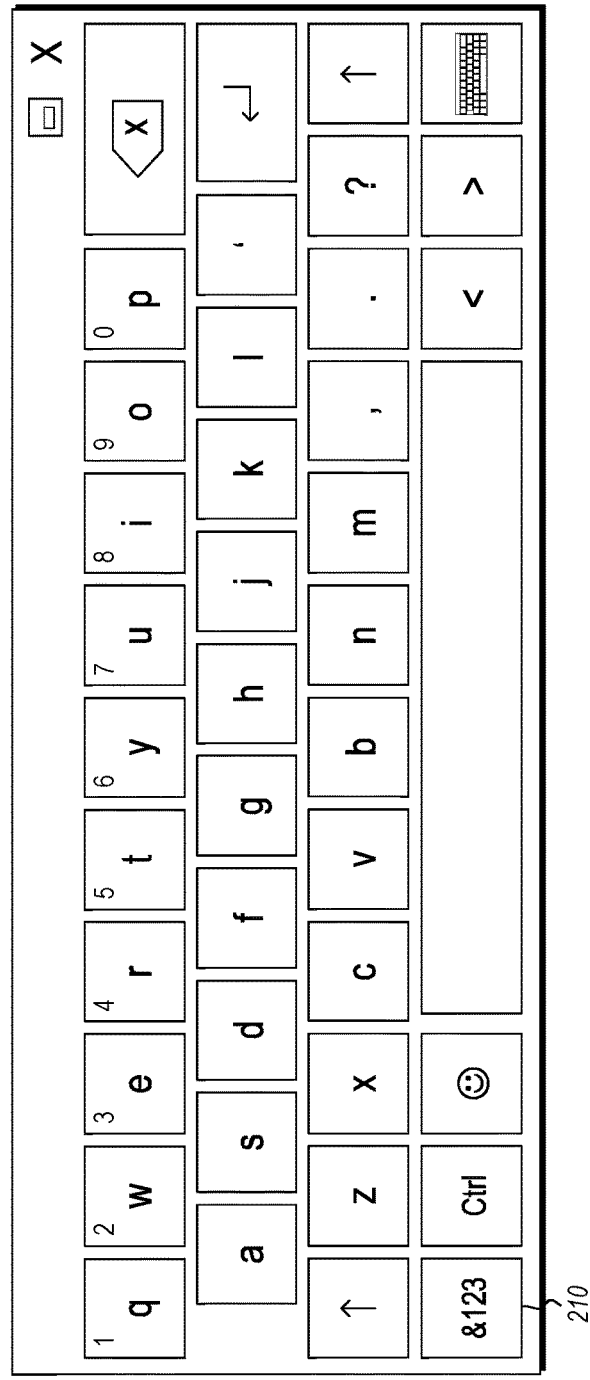
FIG. 2A illustrates an example primary keyboard layout.
Figure 2B:
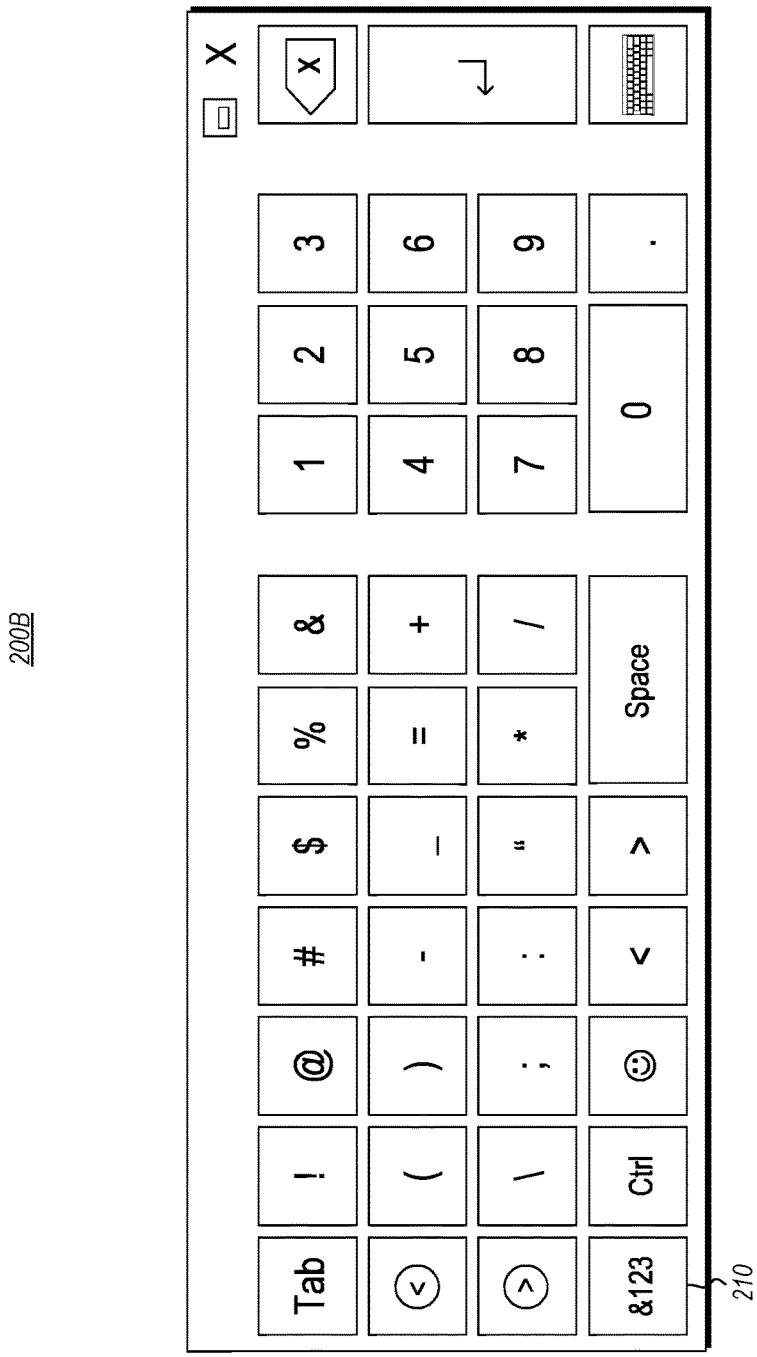
FIG. 2B illustrates an example alternative keyboard layout.

Keyboard 200A includes alternative character key 210, which allows a user of touchscreen keyboard 200 to toggle between the primary layout demonstrated in FIG. 2A to an alternate keyboard layout 200B, as shown in FIG. 2B. As illustrated, alternative keyboard layout 200B includes number keys (i.e., '1', '2', '3', and so forth), as well as other keys such as an '@' key, '_' key, '#' key, '$' key, and so forth. While each of the previously discussed alternative character keys is included in alternate keyboard layout 200B, any one or more of the alternative character keys may alternatively be included in the primary keyboard layout 200A.

While keyboard layouts, such as those illustrated in FIGS. 2A and 2B, are typical, they can often be inconvenient for typing email addresses, phone numbers, or any other string of characters that requires a mixture of the primary characters (i.e., 'a', 'b', 'c', 'd', and so forth) on the primary keyboard layout 200A and alternative characters (i.e., '1', '2', '@', '_', '#', '$', and so forth) on the alternative keyboard layout 200B. For instance, a typical user may have an email address such as 23john_smith@fiction-email.com. Referring to FIGS. 2A and 2B, when typing such an email address on a touchscreen keyboard, the user must first toggle to the alternative keyboard layout 200B to type '23', then toggle to the primary keyboard layout 200A to type 'john', then toggle to alternative keyboard layout 200B to type '_', then toggle to primary keyboard layout 200A to type 'smith', then toggle back to alternative keyboard layout 200B to type '@', then toggle to the primary keyboard layout 200A to type "fiction, then toggle to alternative keyboard layout 200B to type "-", and finally toggle back to primary keyboard layout 200A to type 'email.com.' Such a process can often be time-consuming and inefficient.

Figure 3:
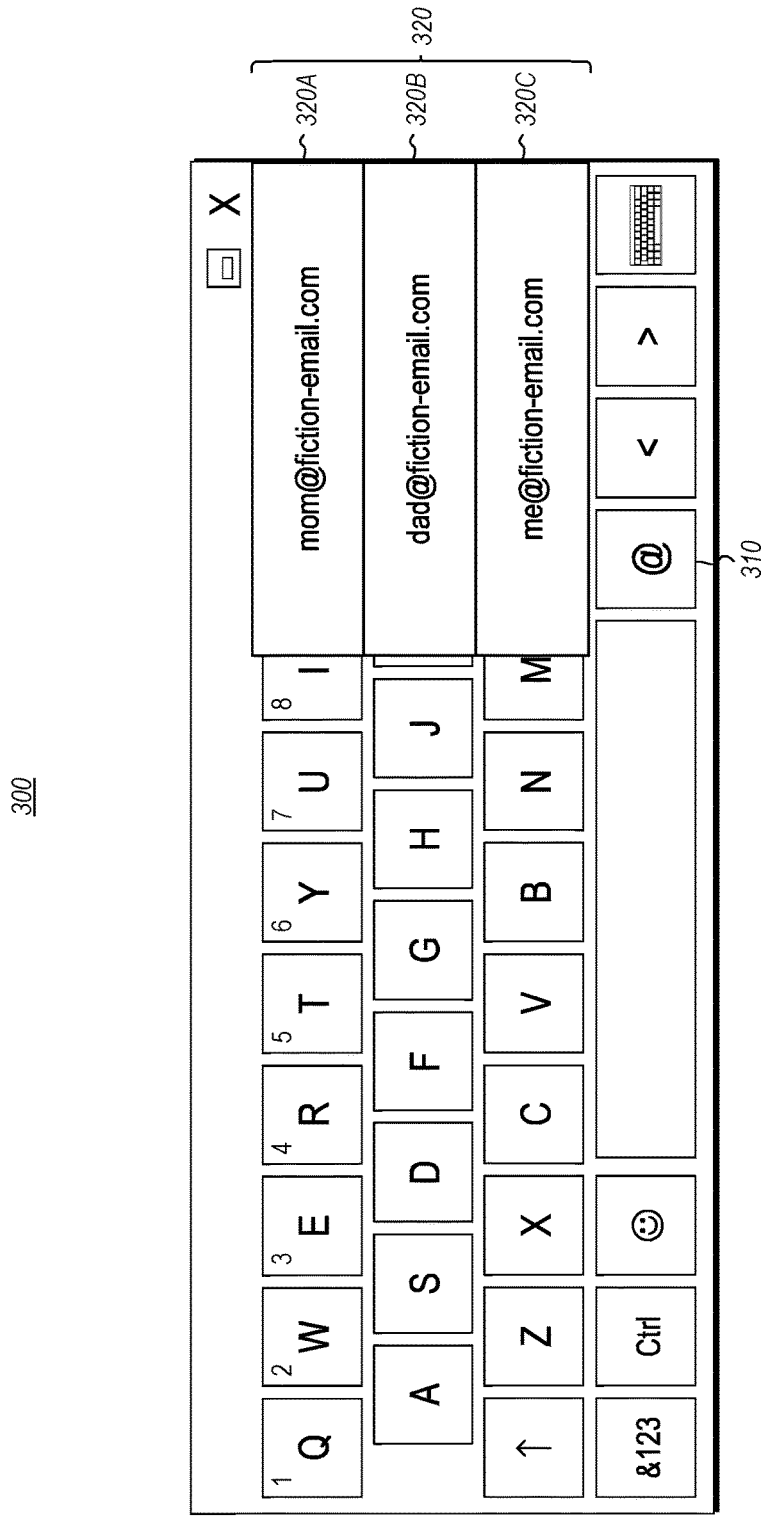
FIG. 3 illustrates an example list population key and associated list within a keyboard layout.

FIG. 3 illustrates an embodiment of a keyboard 300 that can allow a user to access strings of characters (e.g., email addresses, home addresses, phone numbers, and so forth) through interaction with a single keyboard key. Accordingly, keyboard 300 includes list population key 310, which when interacted with by a user, may dynamically populate list 320 with contextually relevant and personalized character strings 320A, 320B, and 320C, as described in more detail below. As shown, list 320 may overlay the primary keyboard layout 200A. However, in other embodiments list 320 may be presented in a window separate from the keyboard. Additionally, a user may be able to customize the way in which list 320 is presented.

While only three character strings (320A, 320B, and 320C) and one list population key 310 are shown, there may be any number of character strings within a list and/or any number of list population keys with an associated list. Furthermore, each list population key may have more than one associated list. For example, list population key 310 may have two associated lists, one having work email addresses and one having personal email addresses. List population key 310 may be presented to a user within primary keyboard layout 200A, alternative keyboard layout 200B, or both.

The list population key 310 itself may be presented within keyboard layout 200A when the computer system 100 detects that a user has interacted with a field of a webpage or an application that expects a string of characters as input. For instance, when a user interacts with an email address field (i.e., a field expecting a user to enter an email address) within a webpage/application, the computer system may detect the interaction and present the list population key 310. The user may then interact with the list population key 310 in order to access a list 320 of personalized and contextual strings (320A, 320B, and 320C), which in the present example would comprise email addresses associated with the user. For instance, the strings may be email addresses that have been recently or frequently used by the user. The user may then select one of the strings to be entered as input, which in the present example would comprise the selection of an email address to be entered as input within the email address field. Once selected, the chosen email address would automatically be used to populate the email address field.

In other embodiments, the list population key may also be presented based on semantic recognition by the computer system. For instance, a user may receive a text message or an email containing text that includes a request for an email address, a phone number, a home address, and so forth. The computer system may recognize such a request and present list population key 310 with semantically related strings that can be used as input. Accordingly, the list 320 associated with list population key 310 may include multiple email address strings, phone number strings, home address strings, and so forth, from which the user can choose. As such, the user may be able to automatically input a selected string into a body of text within an application (e.g., the body of an email, the body of a text message, within a text editing application, and so forth).

As illustrated in FIG. 3, the list population key comprises an '@' key, however, the list population key is not limited to the '@' key or any other specific key(s). In some embodiments, the specific list population key(s) may be automatically selected by the computer system 100 based on a context of the user's interaction with the keyboard. For instance, if a user has selected an input field for an email address, the computer system 100 may select the '@' key as the list population key because the user would have to enter the '@' key eventually in order to enter a complete email address.

Likewise, in a circumstance involving a user selecting an input field for a phone number, the computer system may select one of the number keys (e.g., '1' key, '2' key, and so forth) or the '-' key as the list population key. Furthermore, the computer system 100 may learn from a user's past interaction with the system to determine the best list population key. For example, the computer may learn that the user almost always uses the same area code for all phone numbers and that phone number includes a '1'. Accordingly, the computer system may choose '1' to be the list population key in such a circumstance.

As noted previously, one or more of the specific list population keys discussed herein (i.e., '@', '1', '-', and so forth) may generally reside on the alternative keyboard layout 200B and thus be hidden from a user when the user is viewing the primary keyboard layout 200A. Accordingly, any one or more of the alternative character keys may be temporarily included in primary keyboard layout 200A based on context. For instance, the '@' key may appear on the primary keyboard 200A in anticipation of the user needing the '@' key to enter a complete email address when the user has interacted with the email address field of a webpage/application. This may occur despite the '@' key not ordinarily appearing on the primary keyboard 200A.

While the previous example is discussed specifically in regards to the '@' key, any key(s) that the computer system 100 determines that the user may need based on a context of the user's current interaction with the computer system, can be placed at least temporarily in the primary keyboard layout. For example, the computer system 100 may determine that a user has interacted with a phone number field that requires the use of a '-' key in order to input a complete phone number. Accordingly, the computer system may place the '-' key in the primary keyboard layout 200A, in such circumstances.

The computer system may determine specific keys within keyboard layout 200A, keyboard layout 200B, or both to be list population key(s) 310, which determination may also be based on a context of a user interaction. Furthermore, as briefly discussed, the computer system may select more than one list population key 310. For example, if a user is currently filling out a web form through a webpage/application that requires an email address, phone number, and a home address, the computer system may determine that there should be three list population keys for each of the required fields. As such, the user may determine that an '@' key will be the list population key for the email address field, a '-' key will be the list population key for the phone number field, and the first letter of the state where the user resides will be the list population key for the home address field. Accordingly, the computer system may at least temporarily place the '@' key and the '-' key in the primary keyboard layout 200A as list population keys, despite those two keys generally being placed in the alternative keyboard layout 200B.

As briefly described herein, in order to access the list(s) 320, a user interacts with list population key 310. Such user interaction may be of any type. For example, in regards to a touchscreen keyboard, a user may press and hold the key, press and swipe any direction on the key (i.e., left, right, up, or down), quickly double tap the key, quickly triple tap the key, or any other similar gesture in regards to the list population key 310. With respect to hardware keyboards, a user may press and hold the key, quickly double tap the key, quickly triple tap the key, or any other similar interaction in regards to the list population key 310.

In some embodiments, the computer system may automatically determine a default way in which a user is to interact with the list population key 310. In such cases, the computer system may also display a prompt to the user as to the way in which the user must interact with the list population key in order to access list 320. In other embodiments, a user may be able to change the default by determining what type of user interaction the user would like to perform with respect to the list population key in order to access the list. In other embodiments, a user may use alternative interactions with a single keyboard key. For example, the user may only have to look at a single keyboard key, say the name of a single keyboard key, and so forth.

The character strings included in the list 320 may be any of a number of types, including a home address, a phone number, flight information, calendar information, appointment/meeting information, personal information, and so forth. Furthermore, the string type may be identified by the computer system 100 based on a context of how the user is currently interacting with the system. For example, if a user has selected an email address field on a webpage/application, an email address string type may be selected. Accordingly, a user in a similar scenario may be able to select list population key 310 and be presented with a list of potential email addresses (e.g., 320A, 320B, and 320C) to enter into the email address field. In other embodiments, the string type may be identified based on the list population key selected. For example, an email address string type may be identified when a user interacts with a list population key represented by the '@' key.

Additionally, each of the presented character strings within list 320 may be user selectable elements, such that when a user selects the element, an action occurs with respect to the selected element. For instance, continuing with the previous example, if me@fiction-email.com were selected by the user from within list 320, then the email address field that the user had previously selected would be populated with the selected email address. In other embodiments, selecting one of the email addresses from list 320 may result in a new email window addressed to the selected email address being displayed, as discussed more fully below. In yet other embodiments, selecting one of the email addresses from list 320 may result in the email address being input as text within a text message, email, or any other application that accepts text as input.

List 320 may be dynamically populated by computer system 100 with character strings based on context. For instance, a user that has selected a field within any type of webpage or application that expects an email address, home address, phone number, flight information, calendar information, appointment/meeting information, personal information, and so forth may be presented with a list of strings of a string type relating to the information expected by the field when the user interacts with the list population key 310 in one of the determined manners described herein.

Once context for the particular string type has been determined, the computer system 100 may identify specific, personalized strings associated with both the determined context and the user, with which to populate the list 320. For instance, the computer system may identify strings associated with the determined context that have been most frequently used by the user or most recently used by the user. In a more specific example, a user interacting with an email address field may be presented with a list 320 of the user's most frequently used, and most recently used, email addresses.

In other embodiments, the computer system 100 may identify various relationships of the user with other users based on an account of the user. For example, a user may have a social media account, an email account, or any other account (e.g., MICROSOFT™ account, GOOGLE™ account, APPLE® ICLOUD® account, and so forth) that identifies other users that have a relationship with the user (e.g., friend, mother, father, sibling, child, and so forth). Based on those relationships, the computer system may identify information (e.g., email address, phone number, home address, flight itinerary, calendar information, and so forth) about those with whom the user has a relationship. The computer system may then use that identified information to populate list 320 with strings personalized for the user. Similarly, the computer system may determine email groups of which the user is a member (e.g., family email group, co-worker email group, and so forth) and identify information (e.g., email addresses, phone numbers, home addresses, and so forth) associated with the email groups. The computer system may also identify information based on a web browser's auto-complete functionality. For instance, the computer system may identify all email addresses that the web browser is capable of auto-completing.

Furthermore, the computer system 100 may gather data from the user's own accounts to populate list 320 with personalized strings. For example, the computer system may identify a birthday, home address, telephone number, email address, and so forth associated with an account of the user. That identified information may then be used to populate list 320 when the identified information has become relevant based on the context of the user's interaction with the computer system, as described herein. For example, when a user interacts with a home address field in a webpage/application, the computer system may identify all addresses associated with the user's account and use the addresses to populate list 320.

In some embodiments, a user interface may be accessed by a user that allows the user to manually determine which specific strings the user would like to have presented. This may include allowing the user to specify which strings to present in particular circumstances, such as time of day, type of application, type of user input field, and so forth. For example, a user may specify one or more particular email addresses to be placed in list 320 whenever the user interacts with an email address field of a webpage or application. Furthermore, a user may be able to both manually edit which specific strings the user would like to have presented in particular circumstances, as well as editing particular strings themselves. For example, if a particular email address of a desired recipient has changed, the user may be able to manually edit the particular email address to reflect the correct email address.

In other embodiments, a combination of strings manually determined by a user and computer-identified strings may be used to populate list 320. For example, a user may make a determination that two user-identified email addresses are always to be presented when email addresses are contextually relevant and that the rest of the email addresses should be provided by the computer system in any of the manners described herein (e.g., recently used, frequently used, relationship information, and so forth).

In another example, a user may specify that particular personal email addresses are to be presented in list 320 when the user is using a personal email application and that particular work email addresses are to be presented in list 320 when the user is using a work email application. In such circumstances, the computer system may identify which email addresses are personal and which email addresses are work-related. Alternatively, the user may be able to manually identify particular email addresses as personal email addresses or work email addresses. In another example, a user may specify that during regular business hours, work email addresses, work phone numbers, and so forth are to be presented in list 320, while during hours outside of regular business hours, personal email addresses, personal phone numbers, and so forth are to be presented in list 320.

Alternatively, the computer system 100 may dynamically determine such context. For example, the computer system may determine that the user generally selects work email addresses, work phone numbers, and so forth during regular business hours and that the user generally selects personal email addresses, personal phone numbers, and so forth during all other times. Accordingly, the computer system may dynamically populate list 320 with personalized strings according to time of day, the type of application used, type of user input field, and so forth based on how the user has interacted with presented lists in the past.

In some embodiments, a user may be able to not only manually identify which strings to include in a list, but also which strings should not be included. This may be particularly useful when the computer system alone has dynamically populated list 320 with personalized strings of the user (i.e., rather than the user having manually modified all or part of the strings included within the populated list). For instance, a user may manually identify one or more email addresses automatically used by the computer system to populate list 320 that the user would not like to be included in the populated list. Furthermore, the user may be able specify which strings to use (or not to use) based on a variety of factors, including time of day, particular app used, a location of the user, and so forth.

Additionally, a user may have control over how many lists are presented for any given list population key. For instance, the user may determine that the user would like to have four lists each time a list population key associated with email addresses is presented. In such a case, the user may determine that the four lists are a frequently used email list, a recently used email list, a work email list, and a personal email list, despite the four lists likely having some overlap. It should be noted, however, that while four lists are discussed in relation to the example above, a user may decide to have any number of lists associated with a list population key.

Oftentimes users may need to be informed of the existence of the list population key 310. Informing the user can be done in any of a number of ways. For example, the specific list population key(s) may be highlighted (e.g., brighter than other keys, different color than other keys, having an outline in a different color) animated (e.g., bouncing, spinning, shaking, peeling up the edge of the key), a badge may be placed on the key(s), a hint may be displayed, a prompt informing the user may be displayed, and so forth.

In some embodiments, informing the user of the existence of the list population key in any of ways discussed herein may happen only until the user has successfully used the list population key. In other embodiments, the user may be informed each time the list population key is available. In yet other embodiments, the user may be able to manually determine when they would like to be prompted. For example, a user may manually determine that the user would only like to be informed of the existence of the list population key(s) in particular applications/webpages, when particular input fields are presented, when specific list population keys have been selected by the computer system that have never been presented to the user before, and so forth.

Figure 4:
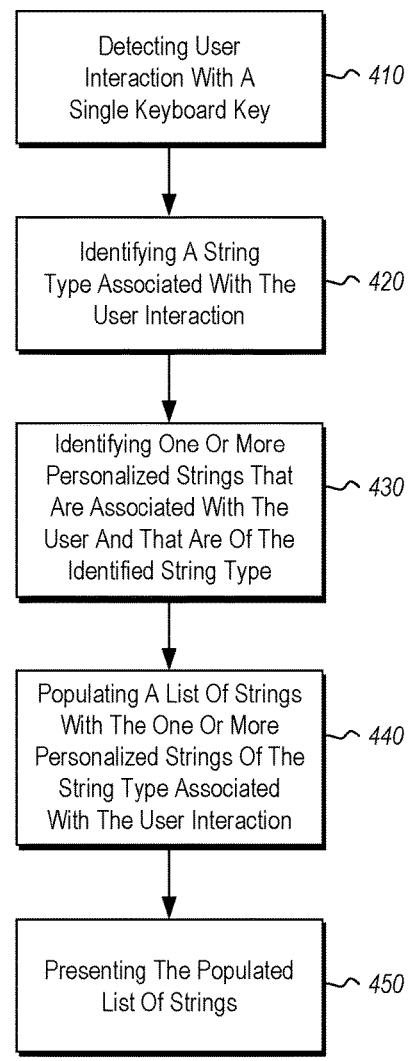
FIG. 4 illustrates a flow chart of an example method for presenting a list of personalized strings to a user.

FIG. 4 illustrates a flow chart of an example method 400 for presenting a list of personalized strings to a user in response to the user's interaction with a key of a keyboard. Method 400 will be described with respect to the components of computer system 100, as well as the keyboard layouts in FIGS. 2A, 2B, and 3. Additionally, the method 400 will be described in relation to a specific example. In the example, a user interacts with an email address input field in a webpage/application. The computer system may detect that the user interacted with the email address input field and in response, the computer system may inform the user of list population key 310. As described herein, the computer system may inform the user of the list population key in various ways, including animating the key, highlighting the key, displaying a hint, displaying a prompt, and so forth.

Additionally, the computer system may determine the specific key to use as the list population key based on a context of the user's interaction. In this example, the context of the user's interaction comprises an interaction with the email address field of the webpage/application. As such, the computer system 100 may select the '@' key as the list population key because the user would have to use the '@' key in order to input a complete email address.

Once the user has been informed of the existence of the list population key, the user may interact with the list population key. Such interactions may be detected by the computer system as being an interaction with the single list population keyboard key (Act 410). In response to detecting the user interaction at the single keyboard key, the computer system may perform a series of acts. First, the computer system may identify a string type associated with the user interaction (Act 420). Because the user interacted with both the email address input field and the list population key (the '@' key in this example), the computer system may identify the string type as being an email address type based off of either interaction. Accordingly, the computer system may base the string type off of any user interaction (e.g., with a webpage/application field, with a list population key, and so forth) or any combination of user interactions.

Once the string type has been identified, the computer system may identify one or more personalized strings that are associated with the user and that are of the identified string type (Act 430). In the present example, the computer system may identify email addresses that have been recently, or frequently, used by the user. The computer system may also be able to identify email addresses of any users that have a relationship (e.g., friends or family) with the user based on an account of the user, as well as the accounts of those with whom the user has a relationship.

Furthermore, the computer system may allow the user to manually identify email addresses that the user would like to have presented in a particular situation such as this, or in any situation relating to email addresses. For instance, the user may manually identify the email address(es) with which the user would like to be presented in relation to particular applications, particular types of email address input fields (e.g., email address input field of a new email window, email address input field of a webpage/application), particular times of day, and so forth. Alternatively, the user may manually identify the email address(es) with which the user would like to be presented in all circumstances relating to email address input fields.

The computer system may then populate a list of strings with the one or more personalized strings of the string type associated with the user interaction (Act 440). In the present example, the computer system may populate the list with types of emails described above in Act 430 (i.e., most frequently used email addresses, most recently used email addresses, and so forth).

Once the list of strings has been populated, the computer system may present the populated list of strings, as illustrated by list 320 in FIG. 3 (Act 450). It should be noted that each string of the list of strings may comprise a user-selectable element, such that the user can perform one or more actions by selecting one or more of the user-selectable element strings. In the present example, by selecting a string, the user may be able to have the computer system automatically input the selected string (i.e., an email address) into the email address input field. In other embodiments, the user may be able to automatically open a new email window addressed to the selected email address. In yet other embodiments, the user may be able to automatically input the selected string into a body of text within an application (e.g., the body of an email, the body of a text message, within a text editing application, and so forth).

In this way, a user using a touchscreen keyboard may, in particular cases, avoid having to toggle back-and-forth between a primary keyboard layout and alternate keyboard layout, thus allowing the user to input personalized strings of a string type that are associated with a context of the user's interaction with the keyboard/computer system. Accordingly, a user may be able to quickly and efficiently select strings of interest that are both unique to the particular user (i.e., personalized) and useful for the particular situation (i.e., contextual) through the use of a single list population key presented within the layout of a keyboard.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
    one or more processors; and
    one or more computer readable storage media having stored thereon computer-executable instructions that are executable by the one or more processors to cause the computer system to control how primary and alternative character keys of a touchscreen keyboard layout are used to present a populated list of character strings that are contextually relevant and personalized for a user entering text with the keyboard, and in a manner that reduces having to frequently toggle between the primary and secondary character keys of the keyboard, and wherein the computer system performs at least the following:
    determines a character key to serve as a list population key, wherein the determination of the list population key is made from among the character keys of a touchscreen keyboard comprising a primary keyboard layout and an alternative keyboard layout, and wherein the list population key is determined from a context that identifies a given string type from a corresponding type of input text;
    detects interaction of a user with one or more character keys of the keyboard, wherein the interaction indicates a type of input text for the given string type;
    responsive to detecting the user interaction at the keyboard, performs at least the following:
        identifies the given string type associated with the user interaction;
        identifies one or more personalized strings that are associated with the user and that are of the identified string type;
        populates a list of strings with the one or more personalized strings of the string type associated with the user interaction, and associates the populated list with the determined list population key; and
        if the determined list population key is among the character keys of the alternative keyboard layout, at least temporarily places the determined list population key with the character keys of the primary keyboard layout; and
        using the list population key at the primary keyboard layout, presents the populated list of strings to the user for selection using the list population key at the primary keyboard layout so that the user is not required to toggle to the secondary keyboard layout to access the list population key while entering text.

2. The computer system of claim 1, wherein the user is informed by the computer system of the determined list population key by performing one of animating the list population key, highlighting the list population key, displaying a hint, and displaying a prompt.

3. The computer system of claim 1, wherein the context that identifies a given string type from a corresponding type of input text comprises identifying one or more email addresses when inputting text using an email address field.

4. The computer system of claim 3, wherein the one or more email addresses are used to populate the list of strings which comprise the one or more personalized strings of the string type that are associated with the user, and wherein the populated list of strings is based on at least one of (i) one or more frequently used email addresses, (ii) one or more recently used email addresses, (iii) one or more email addresses of one or more second users having an account associated with an account of the user, and (iv) one or more user-defined email addresses.

5. The computer system of claim 1, wherein identifying one or more personalized strings that are associated with the user and that are of the identified string type is based on gathering data from an account of the user.

6. The computer system of claim 1, wherein the identified string type comprises an email address type.

7. The computer system of claim 1, wherein the identified string type comprises a phone number type.

8. The computer system of claim 1, wherein the list population key is an @ key.

9. The computer system of claim 1, wherein associating the populated list with the determined list population key comprises having the list population key automatically selected by the computer system.

10. The computer system of claim 1, wherein associating the populated list with the determined list population key comprises having the list population key manually selected by the user.

11. A computer-implemented method for controlling how primary and alternative character keys of a touchscreen keyboard layout are used to present a populated list of character strings that are contextually relevant and personalized for a user entering text with the keyboard, and in a manner that reduces having to frequently toggle between the primary and secondary character keys of the keyboard comprising:
    determining a character key to serve as a list population key, wherein the determination of the list population key is made from among the character keys of a touchscreen keyboard comprising a primary keyboard layout and an alternative keyboard layout, and wherein the list population key is determined from a context that identifies a given string type from a corresponding type of input text;
    detecting interaction of a user with one or more character keys of the keyboard, wherein the interaction indicates a type of input text for the given string type;
    responsive to detecting the user interaction at the keyboard, performing at least the following:
        identifying the given string type associated with the user interaction;
        identifying one or more personalized strings that are associated with the user and that are of the identified string type;
        populating a list of strings with the one or more personalized strings of the string type associated with the user interaction, and associating the populated list with the determined list population key; and
        if the determined list population key is among the character keys of the alternative keyboard layout, at least temporarily placing the determined list population key with the character keys of the primary keyboard layout; and
    using the list population key at the primary keyboard layout, presenting the populated list of strings to the user for selection using the list population key at the primary keyboard layout so that the user is not required to toggle to the secondary keyboard layout to access the list population key while entering text.

12. The method of claim 11, wherein the identified string type comprises one of an email address type and a phone number type.

13. The method of claim 11, wherein the user is informed of the determined list population key.

14. The method of claim 13, wherein informing the user comprises at least one of animating the list population key, highlighting the list population key, displaying a hint, and displaying a prompt.

15. The method of claim 11, wherein associating the populated list with the determined list population key comprises having the list population key automatically selected by the computer system.

16. The method of claim 11, wherein the context that identifies a given string type from a corresponding type of input text comprises identifying one or more email addresses when inputting text using an email address field.

17. The method of claim 16, wherein the one or more email addresses are used to populate the list of strings which comprise the one or more personalized strings of the string type that are associated with the user, and wherein the populated list of strings is based on at least one of (i) one or more frequently used email addresses, (ii) one or more recently used email addresses, (iii) one or more email addresses of one or more second users having an account associated with an account of the user, and (iv) one or more user-defined email addresses.

18. The method of claim 11, wherein associating the populated list with the determined list population key comprises having the list population key manually selected by the user.

19. The method of claim 11, wherein identifying the one or more personalized strings that are associated with the user and that are of the identified string type is based on gathering data from an account of the user.

20. One or more hardware storage devices having stored thereon computer-executable instructions that are executable by one or more processors to, the computer-executable instructions causing the computing device to execute a computer-implemented method of controlling how primary and alternative character keys of a touchscreen keyboard layout are used to present a populated list of character strings that are contextually relevant and personalized for a user entering text with the keyboard, and in a manner that reduces having to frequently toggle between the primary and secondary character keys of the keyboard, and wherein the computing device performs at least the following when executing the computer-implemented method:

determines a character key to serve as a list population key, wherein the determination of the list population key is made from among the character keys of a touchscreen keyboard comprising a primary keyboard layout and an alternative keyboard layout, and wherein the list population key is determined from a context that identifies a given string type from a corresponding type of input text;

detects interaction of a user with one or more character keys of the keyboard, wherein the interaction indicates a type of input text for the given string type;

responsive to detecting the user interaction at the keyboard, performs at least the following:
    identifies the given string type associated with the user interaction;
    identifies one or more personalized strings that are associated with the user and that are of the identified string type;
    populates a list of strings with the one or more personalized strings of the string type associated with the user interaction, and associates the populated list with the determined list population key; and
    if the determined list population key is among the character keys of the alternative keyboard layout, at least temporarily places the determined list population key with the character keys of the primary keyboard layout; and using the list population key at the primary keyboard layout, presents the populated list of strings to the user for selection using the list population key at the primary keyboard layout so that the user is not required to toggle to the secondary keyboard layout to access the list population key while entering text.

* * * * *